(12) United States Patent
Durham et al.

(10) Patent No.: US 7,761,674 B2
(45) Date of Patent: Jul. 20, 2010

(54) IDENTIFIER ASSOCIATED WITH MEMORY LOCATIONS FOR MANAGING MEMORY ACCESSES

(75) Inventors: David Durham, Beaverton, OR (US);
Ravi Sahita, Beaverton, OR (US); Uday R. Savagaonkar, Beaverton, OR (US);
Priya Rajagopal, Worcester, MA (US);
Hormuzd M. Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1238 days.

(21) Appl. No.: 11/322,669

(22) Filed: Dec. 30, 2005

(65) Prior Publication Data

US 2007/0156999 A1  Jul. 5, 2007

(51) Int. Cl.
*G06F 12/00* (2006.01)
*G06F 13/00* (2006.01)
*G06F 13/28* (2006.01)

(52) U.S. Cl. .................. 711/163; 711/147; 711/154; 711/170

(58) Field of Classification Search .................. 711/163
See application file for complete search history.

(56) References Cited

U.S. PATENT DOCUMENTS 5,987,557 A * 11/1999 Ebrahim ................... 710/200
6,496,847 B1 * 12/2002 Bugnion et al. ............... 718/1
6,542,919 B1 *  4/2003 Wendorf et al. ............ 718/100
6,751,737 B1 *  6/2004 Russell et al. ............... 726/34
6,823,433 B1    11/2004 Barnes et al.
6,832,257 B1 * 12/2004 Gamo ....................... 709/229
7,478,394 B1 *  1/2009 de Dinechin et al. ........ 718/108
7,506,122 B1 *  3/2009 Agesen et al. .............. 711/163
2005/0289542 A1 * 12/2005 Uhlig et al. .................. 718/1

OTHER PUBLICATIONS

Wagle, Perry. StackGuard: Simple Stack Smash Protection for GCC. Aug. 2001. Imunix, Inc. GCC Developers Summit 2003. pp. 244-256.*

Grevstad, Eric, "CPU-Based Security: The NX Bit," Jupiterimages, May 24, 2004, 3 pgs.

Uhlig, Rich, et al., "Intel Virtualization Technology," IEEE Computer Society, May 2005, pp. 48-56.

* cited by examiner

*Primary Examiner*—Brian R Peugh
*Assistant Examiner*—Ryan Bertram
(74) *Attorney, Agent, or Firm*—Schwabe, Williamson & Wyatt, P.C.

(57) ABSTRACT

Embodiments of apparatuses, articles, methods, and systems for associating identifiers with memory locations for controlling memory accesses are generally described herein. Other embodiments may be described and claimed.

15 Claims, 4 Drawing Sheets

IDENTIFIER ASSOCIATED WITH MEMORY LOCATIONS FOR MANAGING MEMORY ACCESSES

FIELD

Embodiments of the present invention relate generally to the field of computer architecture, and more particularly to managing memory accesses in said architectures through identifiers associated with memory locations.

BACKGROUND

Software programs operating on a host system often interact with other software, firmware, or hardware components executing on the same host system. The software programs may be divided on the operating environment (hardware and/or software) of the host system based on levels of privilege. The software programs are traditionally protected only by the privileged levels associated with executing code. Each different level of privilege allows software executing within that level to perform a certain set of operations. Programs executing within a given privilege level typically have access to some or all of the resources used by other programs executing in that privilege level and/or lower privilege levels. Thus, there is no protection of software programs within privilege levels on the platform, making the software programs vulnerable to compromise if another software program of the same privilege level becomes compromised.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Embodiments of the present invention may provide a method, apparatus, and system for enabling a secure platform. More specifically, embodiments of the present invention may provide an architecture providing memory access policies based on associated identifiers.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific devices and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

The phrase "A and/or B" means "(A), (B), or (A and B)." The phrase "at least one of A, B and C" means "(A), (B), (C), (A and B), (A and C), (B and C) or (A, B and C)."

Figure 1:
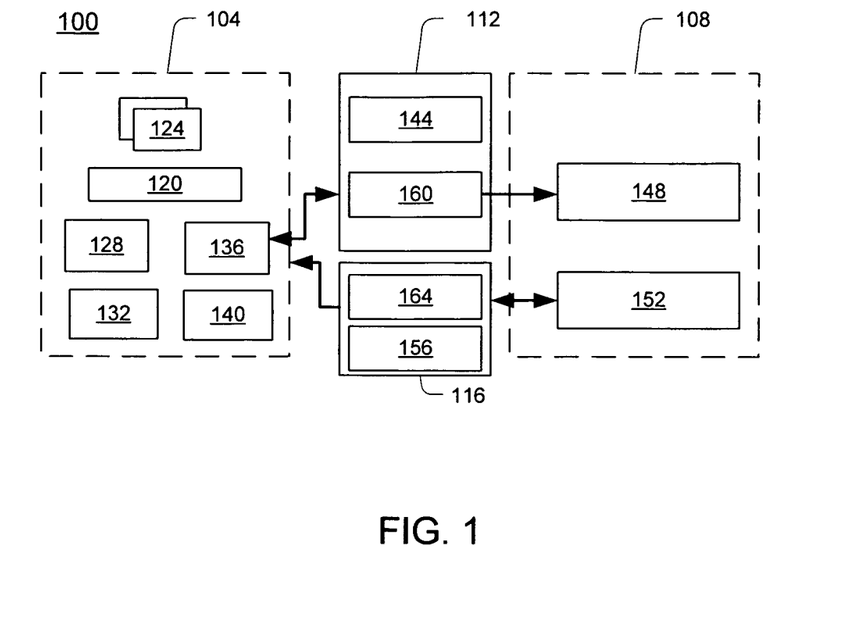
FIG. 1 illustrates a platform having dual execution environments to secure memory accesses in accordance with an embodiment of the present invention.

FIG. 1 illustrates a platform 100 having dual execution environments to secure memory accesses, in accordance with an embodiment of the present invention. The platform 100 may have a host execution environment, e.g., host environment 104, an auxiliary execution environment, e.g., auxiliary environment 108, a main memory 112, and an auxiliary memory 116, coupled with each other as shown. The auxiliary memory 116 may have a number of access policies relating to the access of content stored in the main memory 112. These access policies may be maintained/managed by one or more components of the auxiliary environment 108.

The auxiliary environment 108 may be securely partitioned from the host environment 104, and may include, e.g., a service processor, a virtual partition using a virtual machine manager, or an embedded microcontroller. In an embodiment, the auxiliary environment 108 may be configured to execute code independently and securely isolated from the host environment 104. In some embodiments, the auxiliary environment 108 may be further configured to prevent components of the host environment 104 from performing operations that would alter, modify, read, or otherwise affect the components of the auxiliary environment 108. In various embodiments, the auxiliary environment 108 may be partitioned from the host environment 104 via a variety of different types of partitions, including an entirely separate hardware partition (e.g., utilizing Active Management Technologies (AMT), "Manageability Engine" (ME), Platform Resource Layer (PRL) using sequestered platform resources, System Management Mode (SMM), and/or other comparable or similar technologies) and/or a virtualized partition (e.g., a virtual machine in a Virtualization Technology (VT) scheme). In various embodiments, a virtualized host may also be used to implement AMT, ME, and PRL technologies (as described in further detail below).

In an embodiment, the main memory 112 and the auxiliary memory 116 may be sequestered from one another in a manner to provide different levels of access to components operating in the host environment 104 and components operating in the auxiliary environment 108. For example, in some embodiments components operating in the auxiliary environment 108 may have read-only access to the main memory 112 and may have read-write access to the auxiliary memory 116 to facilitate management of access policies. Furthermore, in some embodiments components operating in the host environment 104 may have read-write access to the main memory 112 and read-only access to the auxiliary memory 116. This restriction of components operating in the host environment to modify the access policies found in the auxiliary memory 116 may facilitate maintenance of security on the platform 100.

It may be noted that the above access levels may refer to generic environmental access levels with the potential of having more particular access policies being applied to particular components operating in each environment. For example, the host environment 104 may include an operating system (OS) 120 for control and/or management of other components including the mediation of information flow between higher-level components, e.g., user apps 124, and lower-level components, e.g., a loader 128, a subject component 132, a memory manager 136, and/or a target component 140. In some embodiments, the subject component 132 and the target component 140 may be software components operating in the same privilege level, or architectural ring. In some embodiments the OS 120 may have no access to the auxiliary memory 116, while certain other components of the host environment 104, e.g., subject component 132, may be provided limited access.

As used herein, the term "component" is intended to refer to programming logic that may be employed to obtain a desired outcome. The term component may be synonymous with "module" and may refer to programming logic that may be embodied in hardware or firmware, or in a collection of software instructions, possibly having entry and exit points, written in a programming language, such as, for example, C++.

A software component may be compiled and linked into an executable program, or installed in a dynamic link library, or may be written in an interpretive language such as BASIC. It will be appreciated that software components may be callable from other components/modules or from themselves, and/or may be invoked in response to detected events or interrupts. Software instructions may be embedded in firmware, such as an electrically erasable programmable read-only memory (EEPROM), or may be stored on a readable medium such as a magnetic or optical storage device. It will be further appreciated that hardware components may be comprised of connected logic units, such as gates and flip-flops, and/or may be comprised of programmable units, such as programmable gate arrays or processors. In one embodiment, the components described herein are implemented as software modules, but nonetheless may be represented in hardware or firmware. Furthermore, although only a given number of discrete software/hardware components may be illustrated and/or described, such components may nonetheless be represented by additional components or fewer components without departing from the spirit and scope of embodiments of the invention.

In an embodiment, the loader 128, the subject component 132, the memory manager 136, and/or the target component 140 may be supervisory-level components, e.g., kernel components. In various embodiments, kernel components may be services (e.g., loader, scheduler, memory manager, etc.), extensions/drivers (e.g., for a network card, a universal serial bus (USB) interface, a disk drive, etc.), or a service-driver hybrid (e.g., intrusion detectors to watch execution of code).

In some embodiments the main memory 112 may organize content stored therein into a number of groups of memory locations. These organizational groups, which may be fixed—and/or variable sized, may facilitate virtual memory management. The groups of memory locations may be pages, segments, or a combination thereof.

A virtual memory utilizing paging may facilitate the emulation of a large logical/linear address space with a smaller physical memory page. Therefore, the host environment 104 may provide a virtual execution environment in which the components may operate, which may then be mapped into physical pages of the main memory 112. The OS 120 may maintain page tables to map the logical/linear addresses provided by components of the host environment 104 to physical address of the main memory 112. More details of the implementation of paging in accordance with embodiments of the present invention may be given below.

In an embodiment, the loader 128 may receive a load request, e.g., from the OS 120, to load content into one or more pages of the main memory 112, e.g., subject pages 144. The loaded content may include, e.g., data pages, having static content, and/or code pages, having executable content. The subject pages 144 may be used for providing processor instructions to a host processor in the execution of the subject component 132. The loader 128 may make a request to the memory manager 136 to allocate subject pages 144. The loader 128 may then load the content into the allocated subject pages 144. The content, upon execution in the host environment 104 may be manifested as the subject component 132.

In an embodiment, the auxiliary environment 108 may include a code location component 148 to identify the location of the subject pages 144 in the main memory 112. The code location component 148 may use the capability of the auxiliary environment 108 to access the main memory 112 to read and locate the subject pages 144 in the main memory 112. The code location component 148 may receive images, e.g., complete images or hashes, of the images or specific subject pages 144, from the host environment 104 and/or a third-party trusted entity, to facilitate their location and/or state verification in the main memory 112. A comparison, e.g., byte-by-byte or through cryptographic hashes, may be done between the image received and the subject pages 144 from the perspective of the auxiliary environment 108. In various embodiments, the code location component 148 may search for the location of the subject pages 144 directly in the main memory 112, e.g., through a direct memory access and/or a messaging system between the auxiliary environment 108 and the host environment 104. A messaging system, for example, may search for the location of the subject pages 144 by using the memory mapped registers of a host processor of the host environment 104. A read of the registers of the host processor may take place through a system management interrupt (SMI), for example.

As shown in FIG. 1, the code location component 148 is located in the auxiliary environment 108; however, in some embodiments, the code location component 148, or portions thereof, may be located elsewhere. Furthermore, in some embodiments, the code location component 148 may additionally/alternatively cooperate with components, e.g., agents, in other execution environments.

In an embodiment utilizing virtualized memory, the location of the subject component 132 may be reported to the code location component 148 as its linear address. The code location component 148 may receive this linear address and access host page tables setup by the host environment 104 to perform a virtual-to-physical address mapping to determine the physical location of the subject page 144 in main memory 112. In an embodiment, the code location component 148 may optionally fetch additional information from the subject component 132 to verify the location and/or state, e.g., through hashes, relocation fix-ups, etc. In an embodiment, the determination of the location of the subject page 144 may be facilitated by having the subject pages 144 pinned in main memory 112.

In an embodiment, the code location component 148 may report the location and/or state of the subject pages 144 to an auxiliary memory manager, e.g., a micro-context manager 152. The micro-context manager 152 may assign an identifier, or micro-context (uC), to the subject pages 144 and store the assigned uC in the auxiliary memory 116, e.g., subject-uC 156. The subject-uC 156 may facilitate storage and subsequent retrieval of various meta-data associated with the subject page 144. For example, in an embodiment, the subject-uC 156 may include access control policies that apply to the content stored in the subject pages 144 of the main memory 112. In various embodiments, these access control policies may be referenced by components of the host environment 104 to control various memory accesses to the subject pages 144 and/or by the subject component 132.

The various management components of the auxiliary environment 108, e.g., the code location component 148 and the uC manager 152, may operate independently from the OS 120 of the host environment. Therefore, management provided by such components may be referred to as OS-agnostic or "out-of-band" (OOB) management.

In an embodiment, one or more pages, e.g., target pages 160, storing data relating to the target component 140 may be located and assigned a target-uC 164 in a manner similar to that discussed above relative to the subject page 144. In an embodiment, the subject component 132 may issue a request to access, e.g., to read/write from/to, content stored in target pages 160. The processor of the host environment 104 may perform an access control check, to determine whether to grant/deny this request, based at least in part on reference to the subject-uC 156 and/or a target-uC 164 stored in the auxiliary memory 116. If the access control check fails, e.g., the subject-uC 156 and the target-uC 164 are incompatible, the processor may issue a page fault exception and/or interrupt the uC manager 152. If the access control check passes, e.g., the subject-uC 156 and the target-uC 164 are compatible, no faults may be issued and the processor may access the requested content.

Figure 2:
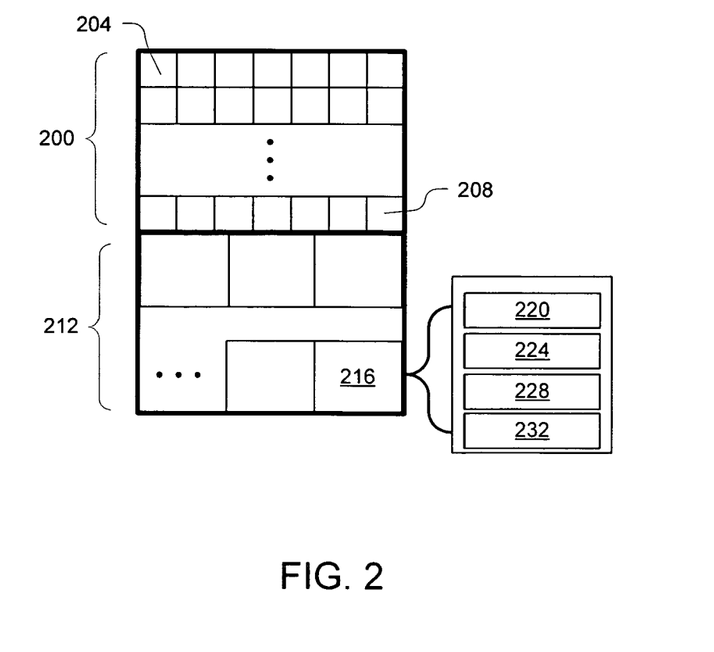
FIG. 2 illustrates data structures of an auxiliary memory in accordance with an embodiment of the present invention.

FIG. 2 illustrates data structures of the auxiliary memory 116 in accordance with an embodiment of the present invention. In this embodiment, an array 200 may include micro-context numbers, e.g., uC1 204-uCN 208, associated with physical pages in the main memory 112. It may be noted that the correspondence between physical pages and micro-contexts may not be one-to-one, e.g., multiple physical pages may have the same micro-context. The micro-context numbers of the array 200 may, in turn, be associated with a corresponding array 212 of micro-context data. A micro-context data entry, e.g., uCN 216 may include access policy fields for data such as permissions 220 (e.g., readable/non-readable, writeable/nonwriteable, hidden/visible, etc.) and/or relational access data 224 (e.g., other micro-contexts that may access this micro-context if marked readable, etc.).

In some embodiments the relational access data 224 may facilitate a number of different components having access to the same pages in the main memory 112. This may be achieved by storing one or more micro-contexts in addition to the primary micro-context associated with the particular page. Such a page may then be accessed by any of the micro-contexts listing in its associated access control data structure in the auxiliary memory 116. This shared access may allow privileged code to be chained together in a chain-of-trust model. For example, if a layered software component A exchanges data with another layered software component B, the auxiliary environment 108 may assign micro-contexts to the layered software components and setup access control policies such that the data pages for A are also marked with a shared micro-context for B-uC. Therefore, when B-uC code accesses A's data, the accesses may be allowed.

In some embodiments, this type of shared access may provide some level of assurance that only packets that traverse a firewall or VPN intermediate driver are delivered to the device driver. Likewise, it may provide some level of assurance that only the device driver can access the frame buffer data segments and so on. This may prevent circumvention of security software by network traffic leaving/entering the system.

In an embodiment uCN 216 may also include fields for data to facilitate context switches, e.g., component entry point data 228 and/or stack state data 232. Utilization of the information stored in these fields may be further described below in accordance with some embodiments of the present invention.

Figure 3:
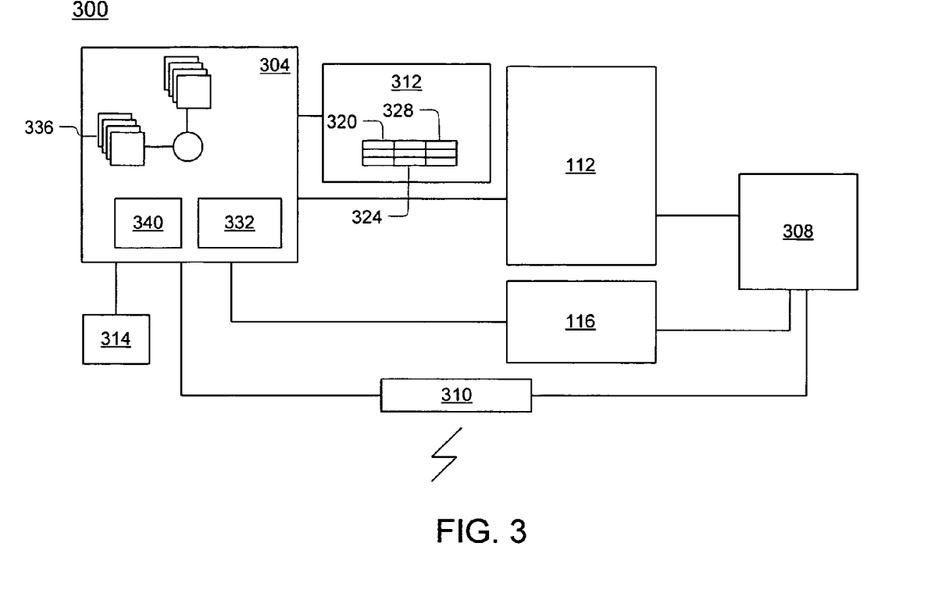
FIG. 3 illustrates a platform having dual processors to provide dual execution environments in accordance with an embodiment of the present invention.

FIG. 3 illustrates a platform 300 having dual processors to provide dual execution environments in accordance with an embodiment of the present invention. The platform 300 may have a host processor 304 to execute components within the host environment 104, and a service processor 308 to execute components within the auxiliary environment 108 described and discussed with reference to FIG. 1. Operational phases, noted herein by numerals in parentheses, may refer to host operations illustrated in FIG. 4 and/or auxiliary operations illustrated in FIG. 5.

Each processor may have associated resources on the platform 300 and may share one or more other resources. Thus, as illustrated in this example, host processor 304 and dedicated processor 308 may each have portions of memory dedicated to them, e.g., main memory 112 and auxiliary memory 116, respectively, and may share other resources, e.g., a network interface 310, to communicatively couple the device to a network.

In various embodiments, a variety of other dedicated and/or shared resources may be included in the platform 300. For example, in an embodiment, the host processor 304 may be communicatively coupled to a peripheral storage device, e.g., disk drive 314, which may include a digital versatile disk drive (DVD), a compact disk (CD) drive, a floppy disk drive, etc.

Figure 4:
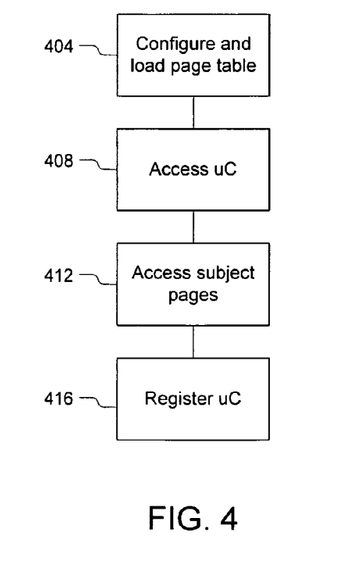
FIG. 4 illustrates operational phases of the host environment in accordance with an embodiment of the present invention.

In an embodiment, the OS 120 may configure and load a page table 312 with the virtual-to-physical mapping of one or more components to be run on the host processor 304, e.g., subject component 132 (404). The page table 312 may have page entries 320, offsets 324, and/or flags 328 to facilitate this mapping. The page table 312, or parts thereof, may be stored in a processor cache, e.g., a translation lookaside buffer (TLB) 332.

The host processor 304 may also use its read-capability of the auxiliary memory 116 to access and load the subject-uC 156 into the TLB 332 (408).

The host processor 304 may utilize the page table 312 for subsequent accesses to the subject pages 144 (412), pursuant to access control policies associated with the subject-uC 156. Execution instructions 336, of the subject component 132, may be processed by the host processor 304 upon a successful access and loading of the subject pages 144.

The host processor 304 may record a micro-context of the page from where the host processor 304 is executing code, e.g., subject-uC 156, in a uC-register 340 (416).

Figure 5:
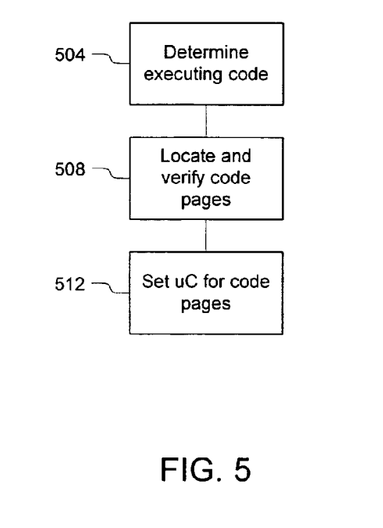
FIG. 5 illustrates operational phases of the auxiliary environment in accordance with an embodiment of the present invention.

In an embodiment, the code location component 148, operating in the auxiliary environment 108, e.g., by being executed by the service processor 308, may determine that the subject component 132 is executing in the host environment 104 (504). In an embodiment, the code location component 148 may determine which component is executing in the host environment 104 by reference to the uC-register 340. In an embodiment, service processor 308 may be prevented from accessing the register directly. Therefore, in this embodiment an SMI may facilitate the provision on this information to the service processor 308. An SMI may be issued by a system management mode (SMM) component operating in the host environment 104, the auxiliary environment 108, or another execution environment. An SMI may cause the host processor 304 to enter the SMM by swapping out the execution instructions 332 for processing instructions related to an interrupt service routine. The host processor 304 may provide data including the state of the uC-register 340, e.g., the micro-context of the code that was executing prior to the interrupt, to an SMM handler. The SMM handler may provide the state of the uC-register 340 to the service processor 308 via main memory 112, for example.

The code location component 148 may locate the subject pages 144 in main memory 112 and verify the state of the subject pages 144 (508) as described above with reference to FIG. 1. The uC manager 152 may then associate a micro-context with the subject page 144 and save the associated micro-context in the auxiliary memory 116 based at least in part on said location and verification of the subject pages 144 (512).

In an embodiment, the subject pages 144 may include a data page, or reference to a data page, which may be added to the page table structure for the subject component 132. This data page may be assigned a micro-context of 0, e.g., not protected, by default. If the subject component 132 intends for the data page to be assigned the same micro-context as the subject component 132, the subject component 132 may make an assignment request to the service processor 308. In an embodiment, this request may be made via an SMI handler. The service processor 308 may assign the data page with the requested micro-context if it is determined that a number of assignment preconditions are met. These assignment preconditions may be met if, e.g., the subject component 132 has the same micro-context as it is requesting be assigned to the data page, and the data page does not already have another micro-context assigned to it.

In an embodiment, a request to remove, or de-assign, a micro-context assignment from a data page, e.g., reassign a protected data page with an unprotected micro-context, may be handled in a similar way. For example, a de-assignment request may be granted by the service processor 308 if a number of de-assignment preconditions are met. These de-assignment preconditions may be met if, e.g., the page was added to the micro-context and/or the data page has the same micro-context as the requestor.

In an embodiment, if the host processor 304 is to access a mapping to a component's pages, along with any associated micro-context, from the TLB 336, the host processor 304 may additionally access the auxiliary memory 116 to determine if any updates to the micro-context have occurred. In various embodiments, updates to the micro-contexts may also be periodically provided to the TLB 336. Provision of the periodic updates may be as a result from a specific request from the host processor 304 and/or may be pushed into the TLB 336.

Figure 6:
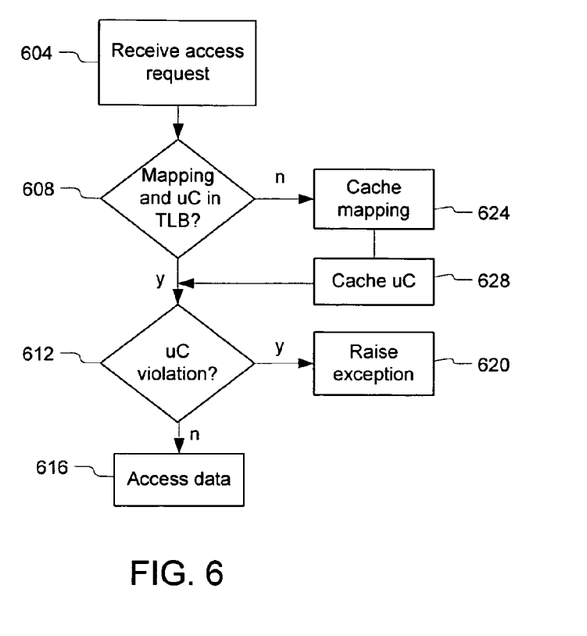
FIG. 6 illustrates an access operation from the host environment in accordance with an embodiment of the present invention.

FIG. 6 illustrates an access operation from the host environment 104 in accordance with an embodiment of the present invention. in an embodiment, the execution instructions 332 may include instructions for the host processor 304 to access content stored in the target pages 160 (604). When the host processor 304 is in a protected mode, the processing instructions may access memory using logical/virtual addresses. An initial lookup may be performed in the TLB 332 to determine if a mapping to the data sought and an associated micro-context are stored therein (608). If a mapping to the corresponding physical address of the target pages 160 and associated micro-context are found, the host processor 304 may perform uC access control check (612). If no uC access violation is present, the host processor 304 may access the target data based on the physical address from the TLB 332 (616). If a uC access violation does result from the access operation, an exception may be raised, e.g., a processor Page-Fault exception (620). In an embodiment, these exceptions may be handled by firmware to ensure appropriate alerts and/or events are logged. However, in other embodiments alerts and/or events may be handled by hardware and/or software implementations.

In an embodiment, for instructions that access data in the main memory 112, the host processor 304 may compare the micro-contexts of the executing code with the micro-context of the page where the address specified in the instruction lie for compatibility. In an embodiment, accesses across micro-contexts may be generally disallowed, with the exception for shared or remapped pages where a list of micro-contexts may be associated with the same physical page.

If the virtual-to-physical address mapping is not found in the TLB 332, the host processor 304 may perform a page walk and cache the mapping to the target pages 160 in the TLB 332 (624). The host processor 304 may additionally cache the target uC 164, from the auxiliary memory 116, in the TLB 332 (628). The host processor may check for uC access violation (612).

Figure 7:
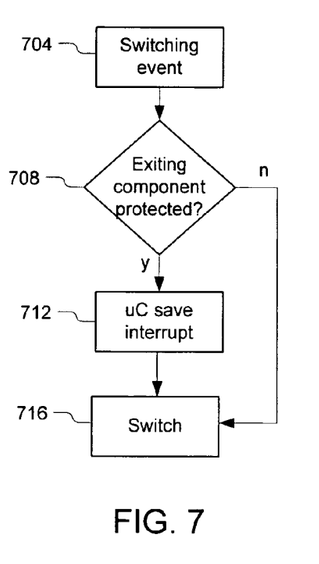
FIG. 7 illustrates a context-switching operation from an exiting component in accordance with an embodiment of the present invention.

FIG. 7 illustrates a context-switching operation in accordance with an embodiment of the present invention. In some embodiments, a number of processes may share the computational resources of the host processor 304. This sharing of resources may be provided through context switches. Context switches may be precipitated by a switching event 704. An implicit context switch may have a switching event such as an interrupt. An explicit context switch may have a switching event such as a CALL opcode issued from the executing component explicitly calling another component.

As discussed herein, a context switch may involve an exiting component, e.g., the component executing prior to context switch, and an entering component, e.g., the component executing following the context switch.

At the switching event, the host processor may determine whether the exiting component is protected, e.g., is the exiting component associated with a non-zero uC (708). If the exiting component is protected, the host processor 304 may perform a micro-context save interrupt by saving an entry point, which may be the physical address where the last instruction was fetched from when the context switch occurred, and data for subsequent verification of the stack-state (712). The entry-point and the stack-state verification data may be saved in the exiting component's micro-context associated space in the auxiliary memory 116.

In various embodiments, data for stack-state verification may include a copy of the entire stack state or an integrity check value (ICV) calculation. An ICV may be calculated on the in parameters of a stack frame by setting the out parameters to default values. Likewise, an ICV may be calculated on the out parameters by setting the in parameters to default values. An ICV calculation and/or verification may be done by the host processor 304 using a key provisioned by the service processor 308 via an SMI, for example.

Following the micro-context save interrupt, the host processor 304 may switch from the exiting component to the entering component (716).

If it is determined that the exiting component is not protected, e.g., has a micro-context of zero, the components may be switched out without a micro-context save interrupt.

Figure 8:
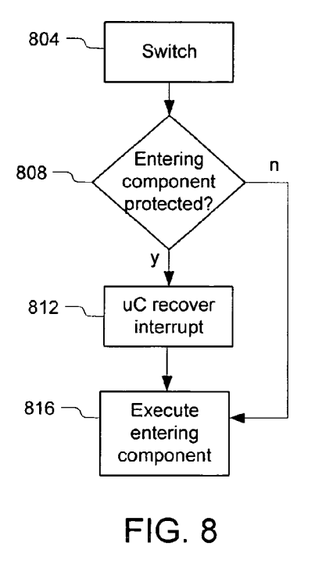
FIG. 8 illustrates a context-switching operation from an entering component in accordance with an embodiment of the present invention.

FIG. 8 illustrates a context switching operation on an entering component, in accordance with an embodiment of the present invention. In this embodiment, a context switch from an exiting component to an entering component may occur (804). A determination may be made as to whether the entering component is protected (808). If the entering component is protected, the host processor 304 may perform a micro-context recover interrupt (812). A micro-context recover interrupt may include accessing the stack-state verification data and the entry point location from the entering component's micro-context. The host processor 304 may verify the state of the stack and, if the stack is verified, resume processing opcodes from the stored entry point location (816). Verification of the stack-state from data stored in protected memory may provide some level of assurance that the stack has not been modified.

In some embodiments, the host processor 304 may look ahead in the pipeline by an instruction, e.g., during decode, to determine that the next instruction belongs to a micro-context other than the current one to facilitate the timely issuance of a micro-context save/restore interrupt.

While the above embodiments, refer generically to implicit and explicit context switches, some embodiments may have a particular rule set governing each type of context switch. For example, in the anticipation of an explicit context switch, entry-point opcodes may be added to verify that the entering component is being executed from special entry points identified in the component's code. If an entry-point opcode is being decoded by the entering component in response to a CALL opcode from the exiting component, no more checks may be needed. If, however, in response to a CALL opcode from exiting component, the next opcode is not an entry-point opcode, then an exception may be raised. This may be particularly useful in a situation where the exiting component is unprotected and the entering component is protected.

In some embodiments fixed entry points may be stored with micro-contexts to allow controlled flow from one uC to another. For example, a component of a first uC may jump into or call a component of a second uC at one of these entry points. At these expected entry points, proper control flow may be achieved. A policy for the component may define where the proper entry points are located. Controlled flow transitions from one component to another at a proper entry point may not generate an exception or interrupt a uC manager.

In some embodiments, fixed entry points may also be referred to as "static entry points" while entry points saved at various switching events, e.g., those saved as a result of a uC save interrupt, may also be referred to as "dynamic entry points."

Figure 9:
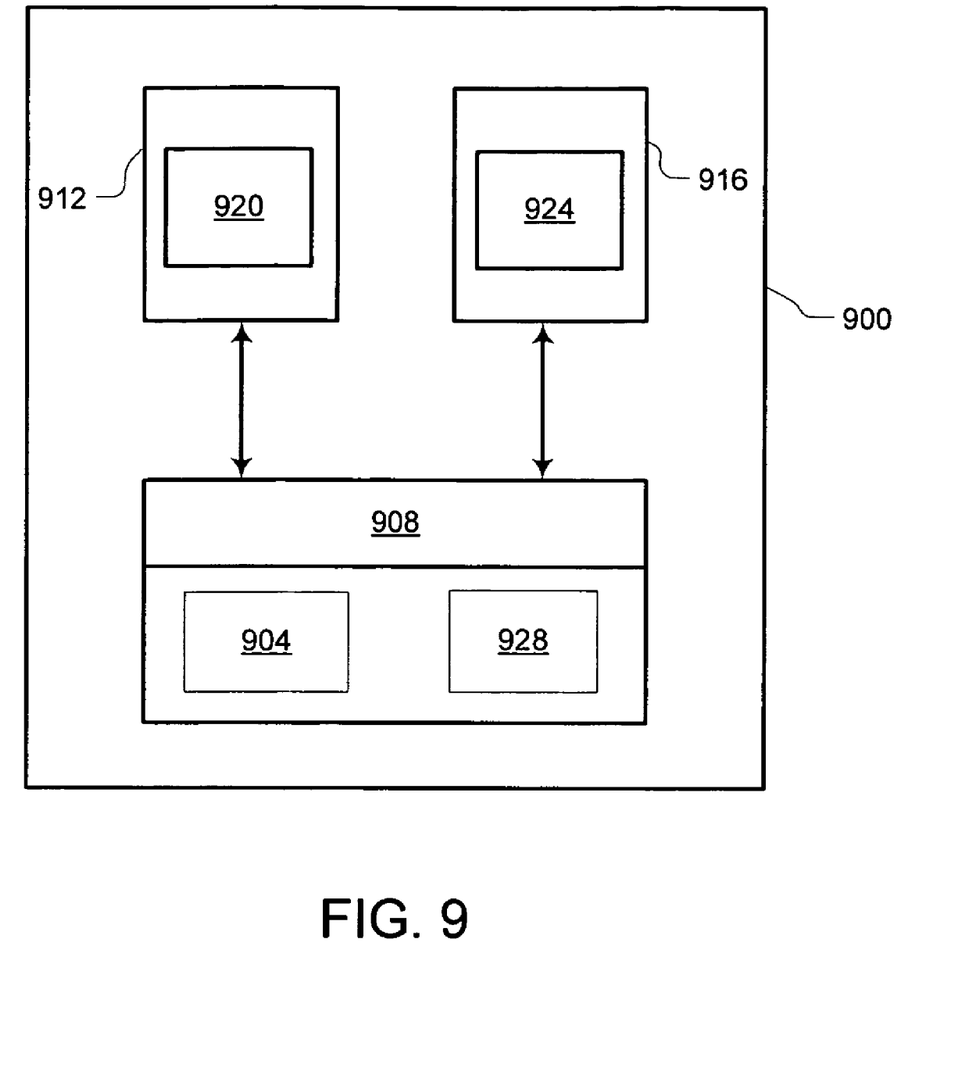
FIG. 9 illustrates a platform utilizing virtualization to provide dual execution environments in accordance with an embodiment of the present invention.

FIG. 9 illustrates a platform 900 utilizing virtualization to provide dual execution environments in accordance with an embodiment of the present invention. The platform 900 may include only a single processor 904 but a virtual machine monitor (VMM) 908 on the device may present multiple abstractions and/or views of the device, such that the underlying hardware of the platform 900 appears as one or more independently operating virtual machines (VMs), e.g., a host VM 912 and an auxiliary VM 916 to provide the host environment 104 and the auxiliary environment 108, respectively. The VMM 908 may be implemented in software (e.g., as a stand-alone program and/or a component of a host operating system), hardware, firmware and/or any combination thereof. The VMM 908 may manage allocation of resources on the platform 900 and perform context switching as necessary to cycle between the host VM 912 and the auxiliary VM 916 according to a round-robin or other predetermined scheme. Although only processor 904 is illustrated, embodiments of the present invention are not limited to only one processor. In various embodiments, multiple processors may also be utilized within a virtualized environment. For example, if the platform 900 includes two processors the auxiliary VM 916 may be assigned a dedicated processor while the host VM 912 (and other host VMs) may share the resources of a host processor.

While the platform 900 shows two VMs, e.g., host VM 912 and auxiliary VM 916, other embodiments may employ any number of VMs. VMs may function as self-contained partitions respectively, running their own components hosted by VMM 908, illustrated as host components 920 and auxiliary components 924.

The host components 920 and auxiliary components 924 may each operate as if the were running on a dedicated computer rather than a virtual machine. That is, host components 920 and auxiliary components 924 may each expect to control various events and have access to hardware resources on the platform 900, e.g., a wireless network interface card 928.

A physical hardware partition with a dedicated processor (as illustrated in FIG. 3, for example) may provide a higher level of security than a virtualized partition (as illustrated in FIG. 9, for example), but embodiments of the invention may be practiced in either environment and/or a combination of these environments to provide varying levels of security.

Embodiments of the present invention shown and described above may facilitate association and management of targeted access policies from an auxiliary environment with respect to the physical pages found in main memory. Although the present invention has been described in terms of the above-illustrated embodiments, it will be appreciated by those of ordinary skill in the art that a wide variety of alternate and/or equivalent implementations calculated to achieve the same purposes may be substituted for the specific embodiments shown and described without departing from the scope of the present invention. Those with skill in the art will readily appreciate that the present invention may be implemented in a very wide variety of embodiments. This description is intended to be regarded as illustrative instead of restrictive on embodiments of the present invention.

What is claimed is:

1. An article comprising:
a tangible computer-accessible storage medium; and
a set of instructions stored in the storage medium, which, when executed by a processor of a first execution environment cause the processor to:
access, from the first execution environment, a first identifier stored in a first memory by a memory manager of a second execution environment securely partitioned from the first execution environment, wherein the first identifier is associated with a first group of memory locations of a second memory associated with a first component of the first execution environment, and wherein the first identifier stored in the first memory is accessible from the first execution environment as read-only, wherein the first execution environment is under the control of a first operating system that does not control the second execution environment; and access first content stored in the first group of memory locations of the second memory based at least in part on the first identifier.

2. The article of claim 1, wherein the set of instructions, which, when executed by the processor further cause the processor to:

switch from the first component, corresponding to the first content stored in the first group of memory locations, to a second component of the first execution environment; and issue a request to the memory manager to save entry-point data and/or stack-state data with the first identifier in the first memory.

3. The article of claim 1, wherein the set of instructions, which, when executed by the processor further cause the processor to:

operate the first component associated with the first identifier; and record the first identifier in a register.

4. The article of claim 1, wherein the set of instructions, which, when executed by the processor further cause the processor to:

access, from the first execution environment, a second identifier stored in the first memory by the memory manager of the second execution environment, wherein the second identifier stored in the first memory is accessible from the first execution environment as read-only; and access second content stored in a second group of memory locations of the second memory based at least in part on the second identifier.

5. The article of claim 4, wherein the first component includes at least a portion of the set of instructions, which, when executed by the processor cause the processor to access the second content, and the set of instructions, which, when executed by the processor further cause the processor to:

access the second content stored in the second group of memory locations of the second memory based at least in part on the first identifier and the second identifier.

6. The article of claim 4, wherein the set of instructions, which, when executed by the processor further cause the processor to:

store the first identifier and/or the second identifier in a cache.

7. A method comprising:

accessing, from a first execution environment, an identifier stored in a first memory by a memory manager of a second execution environment securely partitioned from the first execution environment, wherein the identifier is associated with a group of memory locations of a second memory associated with a first component of the first execution environment, wherein the identifier stored in the first memory is accessible from the first execution environment as read-only, wherein the first execution environment is controlled by a first operating system that does not control the second execution environment; and accessing, from the first execution environment, content stored in the group of memory locations of the second memory based at least in part on the identifier.

8. The method of claim 7, further comprising:

switching from the first component, corresponding to the content stored in the group of memory locations, of the first execution environment to a second component of the first execution environment; and issuing a request to the memory manager of the second execution environment to save entry-point data and/or stack-state data with the identifier in the first memory.

9. The method of claim 7, further comprising:

accessing an entry point and/or stack-state verification data stored with the identifier in the first memory.

10. The method of claim 8, wherein said issuing of the request to save the entry point data and/or stack state data includes: calculating an integrity check value on a stack of the first execution environment.

11. The method of claim 9, wherein said accessing an entry point and/or stack-state verification data stored with the identifier in the first memory, further comprises:

accessing a static and/or a dynamic entry point.

12. The method of claim 11, wherein a first component of the first execution environment corresponds to the content stored in the group of memory locations of the second memory, the method further comprising:

operating a second component; and switching said operating of a second component to operating of the first component based at least in part on said accessing of a static and/or dynamic entry point.

13. The method of claim 7, wherein said accessing content based at least in part on the identifier, further comprises:

issuing a request to access the content;

performing an access control check based at least in part on the identifier; and granting or denying the request to access the content based at least in part on the access control check.

14. A system comprising:

a first memory having a first group of memory locations to store first content;

a second memory;

a first component of a first execution environment coupled to the second memory and configured to store a first identifier, associated with the first group of memory locations, in the second memory;

a second component of a second execution environment, from which the first execution environment is securely partitioned, coupled to the first memory and configured to access the first content based at least in part on the first identifier, wherein access of the first identifier when stored in the second memory is read-only from any components of the second execution environment, wherein the second execution environment is controlled by an operating system that does not control the first execution environment; and a disk drive communicatively coupled to the second execution environment.

15. The system of claim 14, further comprising the first memory having a second group of memory locations to store second content corresponding to the second component;

wherein the first component is further configured to store a second identifier associated with the second group of memory locations, in the second memory; and wherein the second component is configured to access the first content based at least in part on the second identifier and access of the second identifier when stored in the second memory is also read-only from any components of the second execution environment.

* * * * *